3,649,700
PROCESS FOR THE DEHYDROCHLORINATION OF CHLORINATED HYDROCARBONS

Herbert Baader, Hermulheim, near Cologne, Kurt Sennewald, Knapsack, near Cologne, Helmut Reis, Hurth, near Cologne, and Gunther Viertel, Bruhl, near Cologne, Germany, assignors to Knapsack Aktiengesellschaft, Knapsack, near Cologne, Germany
No Drawing. Filed Nov. 22, 1967, Ser. No. 684,939
Claims priority, application Germany, Dec. 20, 1966, K 60,964
Int. Cl. C07c 21/04
U.S. Cl. 260—654 D                    4 Claims

ABSTRACT OF THE DISCLOSURE

Process for the dehydrochlorination of chlorinated hydrocarbons by heating the same in the presence of alkyl phosphine and/or aryl phosphine and/or their hydrochlorides or quaternary phosphonium chlorides as a catalyst, at a temperature between 100 and 250° C., and by distilling off the resulting dehydrochlorinated products and hydrogen chloride, which comprises heating the chlorinated hydrocarbons under a pressure between 2 and 21 atmospheres absolute.

---

The present invention relates to a process for the dehydrochlorination of chlorinated hydrocarbons by heating the same in the presence of alkyl phosphine and/or aryl phosphine and/or their hydrochlorides or quaternary phosphonium chlorides as a catalyst, at a temperature between 100 and 250° C., and distilling off the resulting dehydrochlorinated products and hydrogen chloride, which process comprises heating the chlorinated hydrocarbons under a pressure between 2 and 21, preferably between 2 and 11, atmospheres absolute.

Chlorinated hydrocarbons containing aliphatically bound chlorine and hydrogen, which may also contain an aryl group as a substituent, are readily accessible to dehydrochlorination. Aliphatic chlorinated hydrocarbons containing 2 to 18, preferably 2 to 4, carbon atoms can be dehydrochlorinated in especially smooth fashion. For example, 1,2,3-trichlorobutane, which may be used in admixture with tetrachlorobutanes, can be dehydrochlorinated to yield a mixture formed essentially of 1,2-dichlorobutene-(2), 1,3-dichlorobutene-(2) and 2,3-dichlorobutene-(1). This mixture in turn is a valuable starting material which can be dehydrochlorinated further to produce 2-chlorobutadiene-(1,3). 1,4-dichlorobutene-(2) and/or 2,3-dichlorobutene-(1) can also be dehydrochlorinated to yield mixtures of 2-chlorobutadiene-(1,3) with 1-chlorobutadiene-(1,3), the mixtures being widely used in industry as monomers and comonomers as well as diene or dienophilic components. Still further, it is possible to dehydrochlororinate 1,1,2,2-tetrachloroethane to obtain trichloroethylene, which is a solvent very suitable for use in dry-cleaning processes and for the use as a metal-degreasing agent.

The catalysts useful in the present process include more especially trialkyl or triaryl phosphine and alkyl phosphines containing 4 to 18 carbon atoms per alkyl group. The catalyst can be used, for example, in a proportion of 0.5 to 20, preferably 0.5 to 15, parts by weight per 100 parts by weight chlorinated hydrocarbon.

The following alkyl radicals can be used as the "alkyl" in the alkyl phosphines: n-butyl, iso-butyl, n-pentyl, n-hexyl, n-heptyl, n-octyl, n-nonyl, n-decyl, n-undecyl, n-dodecyl (lauryl), palmityl, stearyl and further isomeric and homologous alkyls. The di- and trialkyl phosphines may also contain various alkyl groups. Triphenyl phosphine, which is easy to handle as a result of its good stability to the action of atmospheric oxygen, is the preferred aryl phosphine. but the various tritolyl or trixylyl phosphines can be used as well. The alkyl or aryl phosphines or their hydrochlorides or quaternary phosphonium chlorides act as true catalysts in the process of the present invention, and every catalyst molecule causes a plurality of chlorinated hydrocarbon molecules to undergo dehydrochlorination. The process of the present invention can be carried out by adding to the reaction mixture no more than a suitable tertiary phosphine, the hydrochlorides and quaternary phosphonium chlorides forming automatically in the presence of hydrogen chloride or the chlorinated hydrocarbon.

Though some particular chlorinated hydrocarbons, treated with triphenyl phosphine, have been found already to undergo slight dehydrochlorination at temperatures lower than 100° C., the dehydrochlorination should conveniently be carried out at temperatures between 130 and 250° C., preferably between 140 and 210° C., to improve catalyst productivity.

The dehydrochlorination velocity is a function of the proportion of catalyst used (e.g. triphenyl phosphine, tributyl phosphine, trilauryl phosphine, tri-p-tolyl phosphine, etc.), which can be varied in suitable manner. Maximum conversion rates are often produced using the catalyst in a proportion as low as 0.5 part by weight per 100 parts by weight chlorinated hydrocarbon, e.g. 1,2,3-trichlorobutane. When the reaction velocity increases, the respective maximum conversion rates are produced using 4 to 8 parts by weight catalyst. Good conversion rates are even obtained with 32 parts by weight catalyst, but the use of increasing catalyst proportions is found to be accompanied by polymerization phenomena, because more than 1 mol hydrogen chloride is then split off per mol 1,2,3-trichlorobutane.

The use of the catalyst in a proportion higher than about 25% by weight is accompanied by increased resin formation, which means reduced yields of desirable dichlorobutenes; in other words, the catalyst loses its selectivity. When the "catalyst activity" is understood to mean the quantity (in grams) of dehydrochlorinated product (for example dichlorobutenes) obtainable per hour with 1 gram catalyst, dissolved in 1 liter chlorinated hydrocarbon (e.g. 1,2,3-trichlorobutane), it will readily be seen that the catalyst activity decreases as the catalyst concentration increases.

Fairly dilute solutions are therefore required to be used in industry to ensure optimum utilization of the catalytic activity and to obtain good yields. This means that fairly large reaction vessels are needed to enable fairly large quantities of chlorinated hydrocarbon to be reacted per unit of time. Needless to say the work-up of such large volumes of liquid entails further expense.

These disadvantageous phenomena can be obviated using catalysts of improved activity to enable dehydrochlorinated product to be obtained per hours in a many times increased quantity, without any need of enlarged apparatus or reduction in yield.

To this end, it is necessary in accordance with the present invention to achieve the dehydrochlorination under elevated pressure. For example, the chlorinated hydrocarbons can be heated inside a closed reaction tube at temperatures between 140 and 210° C. On the other hand, it is advantageous so to adjust pressure and temperature that the chlorinated hydrocarbon be just kept boiling while hydrogen chloride is split off. This means that the olefins formed can be expelled more readily.

For example, distillation under pressure, where a valve can be used to regulate the quantity of gaseous hydrogen chloride to remove, and to establish the presure desired to prevail in the column and it sump portion, is a simple experimental procedure to achieve this.

On the other hand, the chlorinated hydrocarbon to undergo dehydrohalogenation can also be conveyed under pressure and together with dissolved catalyst through a flow reactor. In this event, the pressure is released immediately downstream from that reactor and the reaction mixture is subjected to finishing treament by subjecting it to distillation at atmospheric pressure. Product including dissolved catalyst, accumulating in the column sump portion is mixed with fresh chlorinated hydrocarbon and returned to the reactor.

The catalyst activity is improved by the application of pressure, as reported above. This is the result, inter alia of the increase in boiling temperature associated with the increase in pressure. However, no increased polymer or resin formation is observed, despite the higher dehydrochlorination temperatures and higher pressures. However, the catalyst could not be expected to have an improved activity under hydrogen chloride pressure because the dehydrochlorination is found to increase the number of mols.

1 mol chlorinated hydrocarbon → 1 mol olefin + 1 mol HCl

By the use of catalysts having an improved activity, it is possible to employ either smaller catalyst proportions or smaller reactors. Furthermore, it is possible to economize the costs of heating, cooling and repumping chlorinated hydrocarbon since more dehydrochlorinated product can be produced per unit of time using the same reactor volume.

EXAMPLE 1,2,3-trichlorobutane, which still contained about 8% by weight 2,2,3,3-tetrachlorobutane, was continuously introduced into the sump portion (4 liters capacity) of a pressure distilling apparatus. The sump portion was filled up to half its volume and contained 134 grams triphenyl phosphine. The 1,2,3-trichlorobutane underwent conversion and gave a mixture formed of 1,2-dichlorobutene-(2), 1,3-dichlorobutene-(2) and 2,3-dichlorobutene-(1), which was removed overhead together with unreacted 2,2,3,3-tetrachlorobutane. The pressure distillation was carried out under a pressure of about 3 atmospheres absolute.

In the following table there are described two tests conducted inside the same apparatus using 134 grams triphenyl phosphine at varying pressure.

TABLE

| Pressure atmospheres absolute | Temperature in sump portion, °C. | Head temperature, °C. | Operation period, hours | Trichlorobutane used, grams | Dichlorobutene mixture obtained, grams | Catalyst productivity [1] |
|---|---|---|---|---|---|---|
| 1 | 165 | 130 | 34 | 20,931 | 14,625 | 3.2 |
| 3 | 195 | 158 | 32 | 32,240 | 22,011 | 5.1 |

[1] Grams dichlorobutene mixture per hour per gram triphenyl phosphine.

We claim:
1. In the process of dehydrochlorinating 1,2,3-trichlorobutane with the formation of hydrogen chloride as gasphase by heating the same in the presence of at least one member selected from the group consisting of trialkyl phosphine, triaryl phosphine, their hydrochlorides and quaternary phosphonium chlorides as a catalyst, at a temperature between 140 and 250° C., and distilling off the resulting dehydrochlorinated products and gaseous hydrogen chloride, the improvement which comprises heating the 1,2,3 - trichlorobutane under a pressure between 2 and 21 atmospheres absolute.

2. The process of claim 1, wherein the 1,2,3-trichlorobutane is heated under a pressure between 2 and 11 atmospheres absolute.

3. The process of claim 1, wherein the 1,2,3-trichlorobutane is heated inside a closed reactor, at a temperature from 140 and 210° C.

4. The process of claim 1, wherein pressure and temperature are adjusted so that the 1,2,3-trichlorobutane is just kept boiling while splitting off hydrogen chloride.

References Cited

UNITED STATES PATENTS 3,413,365   11/1968   Sennewald et al. __ 260—654 D

FOREIGN PATENTS 848,598   9/1960   England _____ 260—655

LEON ZITVER, Primary Examiner

J. A. BOSKA, Assistant Examiner

U.S. Cl. X.R.

260—655